United States Patent [19]
Sutherland et al.

[11] Patent Number: 6,085,316
[45] Date of Patent: Jul. 4, 2000

[54] LAYERED COUNTERFLOW PIPELINE PROCESSOR WITH ANTICIPATORY CONTROL

[75] Inventors: Ivan E. Sutherland, Santa Monica; Charles E. Molnar, deceased, late of Sunnyvale, by Donna A. Molnar, executrix; Ian W. Jones, Palo Alto; William S. Coates, Redwood City; Jon Lexau, Mountain View, all of Calif.

[73] Assignee: Sun Microsystems, Inc., Palo Alto, Calif.

[21] Appl. No.: 09/123,587

[22] Filed: Jul. 28, 1998

[51] Int. Cl.[7] ............................. G06F 9/38; G06F 9/28; G06F 13/40

[52] U.S. Cl. ..................... 712/245; 712/23; 712/210; 712/201; 710/29; 710/20

[58] Field of Search ................................. 712/14, 13, 18, 712/42, 23, 24, 200, 29, 16, 20, 201, 215, 245, 206, 210, 4, 8; 708/54; 710/29, 20; 713/600

[56] References Cited

U.S. PATENT DOCUMENTS

| | | | |
|---|---|---|---|
| 4,658,355 | 4/1987 | Hatakeyama | 712/4 |
| 5,572,690 | 11/1996 | Molnar et al. | 712/200 |
| 5,600,848 | 2/1997 | Sproll et al. | 712/42 |
| 5,758,139 | 5/1998 | Sutherland et al. | 713/600 |
| 5,805,838 | 9/1998 | Sutherland et al. | 710/112 |

FOREIGN PATENT DOCUMENTS

| | | |
|---|---|---|
| 650 116 A1 | 10/1994 | European Pat. Off. . |
| 650 117 A1 | 10/1994 | European Pat. Off. . |
| 810 529 A1 | 5/1997 | European Pat. Off. . |

OTHER PUBLICATIONS

Rolf Ernst, "Long Pipelines in Single–Chip Digital Signal Processors—Concepts and Case Study", *IEEE Transactions on Circuits and Systems, No. 1* (1991):100–108.

*Primary Examiner*—Daniel H. Pan
*Attorney, Agent, or Firm*—Townsend and Townsend and Crew LLP

[57] ABSTRACT

A layered counterflow pipeline structure is described in which sub-tasks performed at each stage in a counterflow pipeline processor are separated into different layers. As words flow through the counterflow pipeline processor, they are divided into partial words which are supplied to the different layers, GET, CHECK and PROCESS, for appropriate handling by that portion of each stage. In the GET layer, partial words passing through each stage are analyzed to determine whether they constitute an encounter pair. In the CHECK layer a determination is made as to whether the word selected by the GET layer requires further modification. Finally, in the PROCESS layer operations are performed on the words themselves based upon control messages from the other layers. The layers of the processor communicate with each other using suitable communication paths such as First In First Out registers.

20 Claims, 6 Drawing Sheets

LAYERED COUNTERFLOW PIPELINE PROCESSOR WITH ANTICIPATORY CONTROL

BACKGROUND OF THE INVENTION

This invention relates to the architecture of computer systems, and in particular to an asynchronous computer system in which a counterflow pipeline processor architecture is partitioned into functionally distinct, interconnected "layers" for faster processing of data flowing through the pipeline.

A counterflow pipeline consists of a number of stages through which two streams of digitally encoded "words" flow in opposite directions. The words can be considered data items and may include instructions, data, or both. For explanation here, we call the opposite directions North and South. It is a defining property of counterflow pipelines that every Northward-flowing word and every Southward-flowing word concurrently present in the pipeline encounter each other exactly once in some stage of the pipeline.

Counterflow pipeline processors are now well known. See, e.g., U.S. Pat. No. 5,572,690, entitled "Cascaded Multistage Counterflow Processor for Carrying Distinct Data in Two Opposite Directions." In a counterflow pipeline processor, the encoded words are of two kinds: data words and instruction words. Data words typically consist of one or more data portions each encoding a data value, and a like number of reference portions, such as an address or tag, each identifying a corresponding data portion within the data word. Instruction words typically consist of an operation portion which specifies a processing step to be performed, and one or more operand-reference portions together with a like number of portions for holding encoded data. Operand-reference portions identify those data portions of words of either kind that are to participate in, or be affected by, the specified operation. In our implementation, instruction words flow only Northward, and data words flow only Southward.

The stages of the counterflow pipeline may ignore some or all parts of any word, working only on selected parts of others. Also, the stages may examine reference parts of the word, and may change the "active" parts of words, or may pass words along unmodified.

The counterflow pipeline stages modify the active parts of certain Northbound and/or Southbound words using information taken from either or both streams. As the words flow, Northbound and Southbound items encounter one another in particular stages of the counterflow pipeline. The stage may change the active parts of a word of either kind, using information contained in any part of that word itself, or according to information from the reference or active parts of a word encountered in the oppositely flowing stream.

To accomplish this task the pipeline must ensure that each and every Southbound word encounters each and every Northbound word in some stage. When a Northbound and a Southbound word encounter each other in some stage, we call them an "encounter pair." In which stage the words encounter each other is not important, but it is essential that each and every Northbound element encounter each and every Southbound element in some stage. The invention described below provides a structure for achieving that result efficiently.

SUMMARY OF THE INVENTION

This invention relates to an improvement on the basic counterflow pipeline structure wherein, in contrast to prior systems, the pipeline is constructed in more than one "layer." Each of the multiple layers of a system, as described below, accomplishes a portion of the overall task. Each layer at times holds parts of both Northbound and Southbound words.

An advantage of this layered construction is that the counterflow pipeline can perform its task more quickly. The improvement in speed comes about because each of the layers can work concurrently with the others on a specialized portion of the overall task. Moreover, as will become evident, some of the layers may omit actions on words not part of an encounter pair, or even omit actions on selected encounter pairs when other layers have already determined, i.e., anticipated, that such omission is possible. Such anticipated omission of unnecessary actions permits the system to complete its work more quickly.

In an embodiment of the invention, a structure is provided for a computer system in which words flow through stages of a counterflow pipeline processor. The structure includes a first layer of processing elements for determining, for each stage, whether the words passing through that stage constitute an encounter pair. The structure also includes a second layer of processing elements for verifying that the words selected by the first layer's processing elements require modification, or are to participate in an operation involving the data in an encounter pair. Also included is a third layer of processing elements for performing operations on the words themselves, based on the anticipatory control information from the first and second layers. The processing elements in the various layers are coupled together using coupling elements, preferably elements which are "elastic," for example, first-in-first-out buffer memory units (FIFOs), which buffer the flow of anticipatory control information from layer to layer.

In addition to providing improved performance, the invention also enables improving local relative delays. Furthermore, the buffering between layers of the processor provided by the FIFOs, or other means, buffers the decision messages, while the data from which they are derived are permitted to move ahead in the processor.

DESCRIPTION OF THE SPECIFIC EMBODIMENTS

Figure 1:
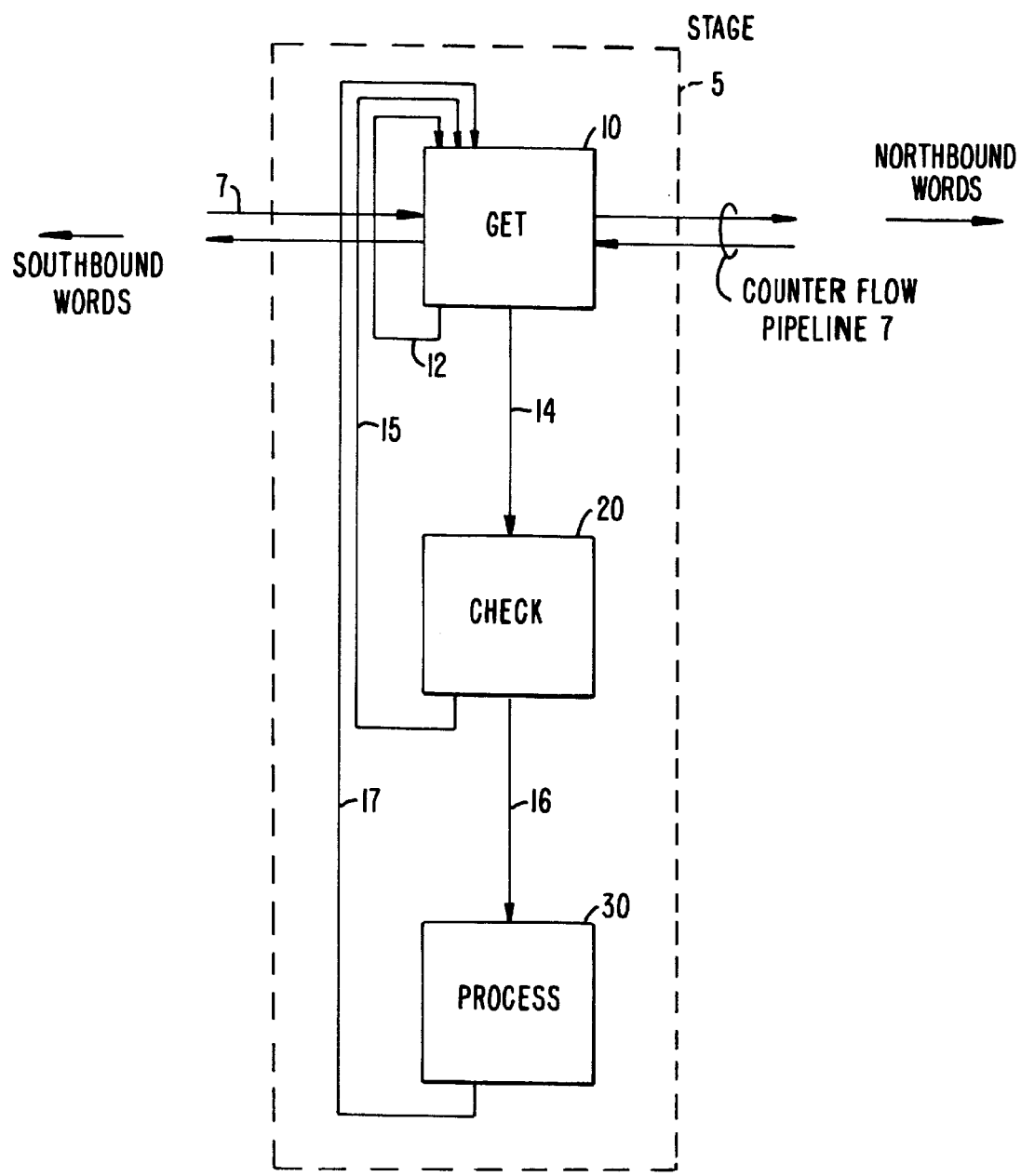
FIG. 1 shows three steps in an exemplary algorithm for each stage, if executed sequentially.

FIG. 1 illustrates a stage of a counterflow pipeline processor. There are three sub-tasks for each stage 5 to accomplish, which are termed GET, CHECK, and PROCESS. The sub-tasks are described in further detail below. Together these three sub-tasks perform all of the necessary operations at each stage 5. In the description that follows, these three sub-tasks are treated separately, although they may be combined in different ways. For example, the GET 10 and CHECK 20 sub-tasks might be combined and then operate with a separate PROCESS 30 sub-task, or a separate GET sub-task might operate with combined CHECK and PROCESS sub-tasks. Furthermore, each of the sub-tasks might be partitioned further so as to have multiple CHECK or multiple PROCESS sub-tasks operating in series or in parallel.

To understand the operation of a stage 5, consider how a stage may behave. If there is uniform full flow of Northbound and Southbound words, the stage will process each Northbound word that reaches it, in conjunction with a corresponding Southbound word. Under these circumstances a hypothetical stage "k" might work on the $n^{th}$ Northbound word in conjunction with the $s^{th}$ Southbound word, treating the two as an encounter pair and leaving to another stage the task of processing the $n^{th}$ Northbound word in conjunction with the $(s+1)^{st}$ Southbound word. (The indexes $n^{th}$, $s^{th}$, etc., refer to the time-ordering of words.)

There may be occasions in the operation of the pipeline, however, when, at some stage, there is a maximum (or large number) of words flowing in a first direction while there is a scarcity of words flowing in the opposite direction. In this case the strategy for each stage is to permit the flow in the one (first) direction, rather than delay the flow in the first direction while waiting for elements arriving from the "scarce" opposite direction. In other words, only when the two words happen to arrive in that stage at nearly the same time does the stage process an encounter pair.

If there is an abundance of flow in one direction and a sparse flow in the opposite direction, a stage behaves differently than when the flow is more balanced. The stage does so for reasons related to the sparser of the two flows. There are generally two possible reasons for a sparse flow: either the flow is congested, or its words arrive only occasionally with gaps between them, so that many of the stages in the direction of sparse flow will be unoccupied.

If the flow is congested, after stage "k" forms an encounter pair from the $n^{th}$ Northbound word and the $s^{th}$ Southbound word, it might form its next encounter pair from the $(n+1)^{th}$ Northbound word and the $s^{th}$ Southbound word. When there is congestion of words, in this example in the Southbound direction, a word, in this example a Southbound one, may participate in several encounter pairs successively in the same stage, each with a different word from the direction of abundant flow.

Alternately, if the Southbound flow is sparse, after stage "k" forms an encounter pair from the $n^{th}$ Northbound word and the $s^{th}$ Southbound word, it may not receive another Southbound word until after it has passed along several Northbound words. In this case it may form and process the next encounter pair from, for example, the $(n+5)^{th}$ Northbound word and the $(s+1)^{th}$ Southbound word.

According to the established operation of counterflow pipeline processors, when a stage passes onward a word that is not part of an encounter pair it leaves the word unmodified. In the case of sparse flow in one direction, many words in the direction of abundant flow will pass through some stages unmodified because they are not part of an encounter pair in those stages. Every word flowing in one direction, however, will have the opportunity to form an encounter pair with each and every word flowing in the other direction in the pipeline at the same time in some stage. Passing along words in the abundant flow direction without modifying those words results in higher overall throughput for the pipeline.

Each word itself consists of a reference portion and a potentially "active" portion or portions. These different portions may be treated differently at the stages. The CHECK 20 sub-task generally deals with the reference parts of the encounter pair, while the PROCESS 30 sub-task generally deals with the "active" parts of the pair. The GET 10 sub-task may not need any values encoded in the words flowing by, using instead only signals indicative of the presence or arrival of the word at that stage.

The equipment implementing each sub-task is usually responsible for interacting with corresponding sub-tasks in the neighboring Northbound and Southbound stages to maintain the proper flow of words along the two opposing pipelines. Each of the sub-tasks may receive, act upon, and pass onward the parts of the words for which it is responsible. In some applications, some of the sub-tasks will pass along these parts unmodified.

When either a Northbound or a Southbound word arrives at a stage 5 via the counterflow pipeline 7, the first decision stage 5 must make concerns the "disposition" of the word. The GET 10 sub-task makes the disposition decision, choosing among four alternatives: First, the GET sub-task at a stage may decide that a particular Northbound and a particular Southbound word will meet in that stage and thus form an encounter pair for that stage. Second, the GET sub-task at a stage may decide simply to pass a Northbound word along unmodified because no suitable Southbound word is present from which to form an encounter pair. Third, the GET sub-task may decide to pass a Southbound word along unmodified for a similar reason; the stage passes along any word unmodified when there is an absence of a convenient counterflowing word from which to form an encounter pair. Fourth, after completing its computation on an appropriate encounter pair in some stage, the instruction word is usually modified; for example, to carry along Northward the result of its computation. The instruction may also generate and insert its result into the oppositely flowing (Southbound) result stream.

Having made the disposition decision, the GET 10 sub-task uses its disposition decision in two ways. First, it acts appropriately on the parts of the word for which it is responsible; for example, seizing both Northbound and Southbound words, or only a Northbound word or only a Southbound word. Second, it sends a message to the other sub-tasks (CHECK and PROCESS) in that stage informing them of its decision so as to enable them to act accordingly. This message saves the other sub-tasks from having again to make a disposition decision, and avoids the possibility that they might make a conflicting disposition decision. This message indicates which pairs of words are to be treated as encounter pairs and which individual parts of those words are to be passed along unmodified.

Figure 2:
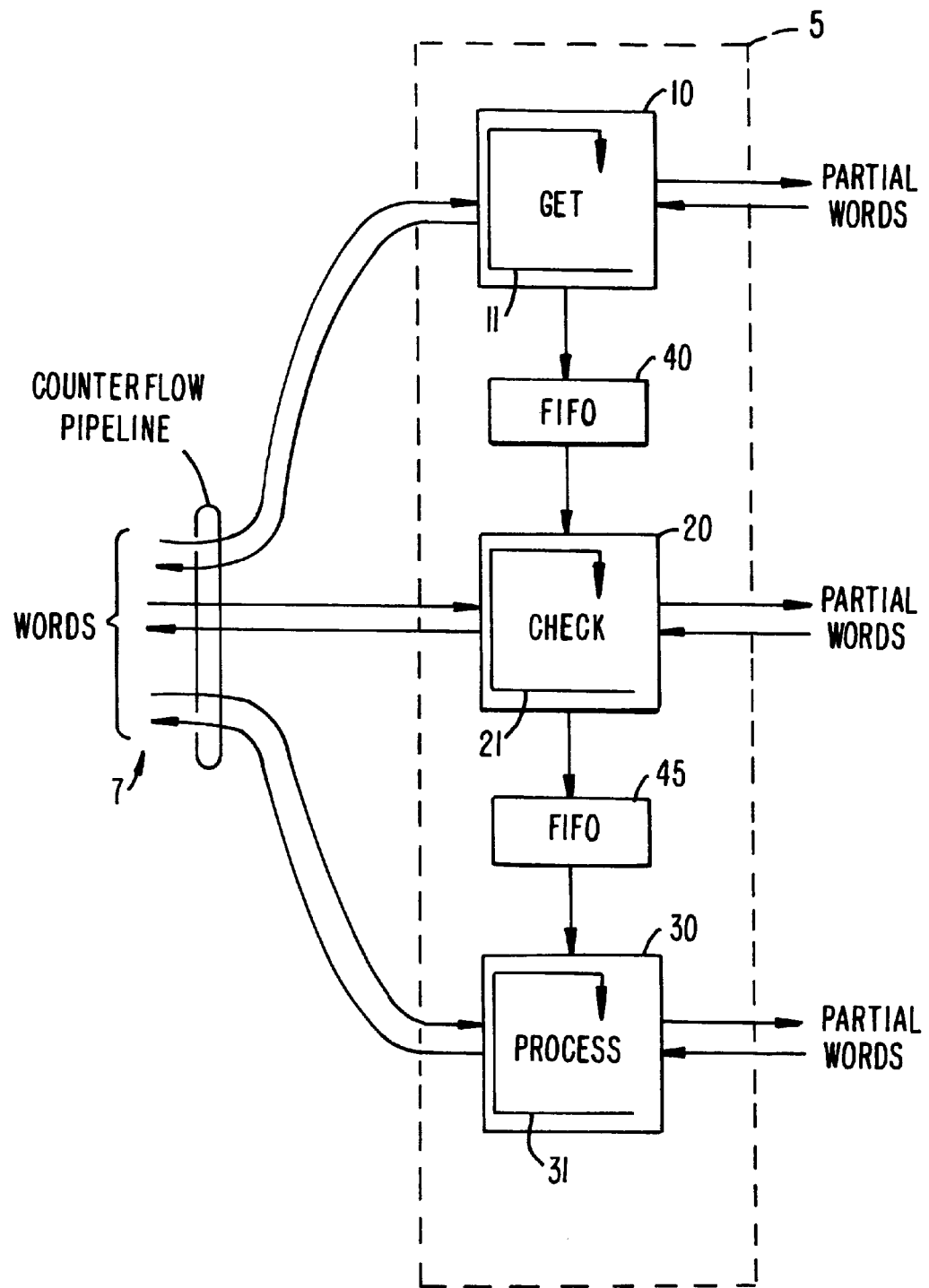
FIG. 2 shows the same three steps for a stage, if executed concurrently.

The form of the message carrying the GET 10 sub-task's disposition decision to the other sub-tasks differs in two embodiments of the system: the "sequential" embodiment of FIG. 1 and the "concurrent" embodiment of FIG. 2. In the sequential embodiment, the GET 10 sub-task is responsible for the entire word. The GET 10 sub-task delivers to other sub-tasks a message containing not only its disposition decision, but also all the required parts of a word. In this embodiment, the GET 10 sub-task may simply avoid such action for individual words when its disposition decision indicates that they are not timely enough to constitute an encounter pair or are unsuitable for some other reason.

In the counterflow pipeline processor, it is possible for information moving in either direction of flow to be inserted into the oppositely flowing stream. For example, an instruction can be held pending messages conveying decisions from a lower layer. As a result, it is valuable in certain cases for the CHECK and PROCESS sub-tasks to inform the GET sub-task of their actions so as to influence its subsequent operation. In at least this circumstance, instead of the unidirectional communications path between layers discussed later in conjunction with FIG. 3, a bidirectional communications path may be employed.

The GET 10 sub-task is charged with ensuring that the required parts of both a Northbound and a Southbound word are present or soon will be brought into a stage 5 for any subsequent actions that require both words. In some cases the GET 10 process will pass along counterflow pipeline 7 its portion of a Northbound or Southbound word unmodified for want of a word flowing in the other direction with which to form an encounter pair. When it does so it will inform the CHECK 20 and PROCESS 30 sub-tasks to do likewise. As previously explained, passing words along unmodified can speed up overall operation of the pipeline.

In FIG. 1, the GET 10 sub-task appears at the top of the figure. The arrow 12 recirculating around the GET sub-task indicates that, for some disposition decisions, no (further) processing is required, and the stage may therefore pass the particular Northbound or Southbound words along unmodified. The arrow 14 passing down to the CHECK 20 sub-task box below represents the path of a message indicating that the GET 10 sub-task has identified an encounter pair for further processing in this stage. In this sequential algorithm the GET 10 sub-task also passes to the CHECK 20 sub-task the words that form the encounter pair, and the GET 10 sub-task then awaits completion of the other sub-tasks before proceeding to make its next disposition decision.

The CHECK 20 sub-task examines all or parts of the words forming the encounter pair, one Northbound and one Southbound, to determine whether further action is required, but makes no changes to the words themselves. In some cases the CHECK 20 sub-task will ascertain that further action on this pair of words is inappropriate. Further processing might be inappropriate because one of the words is marked as already processed, because the two words are of incompatible types, because the values of some fields within the words indicate that further action is unnecessary, or for other reasons depending on the situation. In most situations the CHECK sub-task will find that further action is inappropriate.

The arrow 15 in FIG. 1 from the CHECK 20 sub-task back to the GET 10 sub-task indicates that when further action on this encounter pair is inappropriate, because the CHECK 20 sub-task finds the words incompatible or for some other reason, the GET sub-task may proceed to make its next disposition decision. The arrow 16 from the CHECK 20 sub-task to the PROCESS 30 sub-task identifies the path of a message indicating that further action is required. In the usual case, control passes to the PROCESS sub-task if and only if the CHECK sub-task finds an encounter pair of words suitable for the actions that the PROCESS sub-task can take.

In a counterflow pipeline processor embodiment, the CHECK 20 sub-task examines register address fields in encounter pairs of the Northbound and Southbound words. In this application, further action is appropriate if and only if the address fields match, indicating that the Northbound word requires particular values carried in the Southbound word or that the Southbound word must be marked as invalid.

Although FIG. 1 shows only a single CHECK 20 sub-task, several CHECK sub-tasks in sequence may be employed in some embodiments. For example, one such sub-task might ascertain if the encounter pair proposed by the GET 10 sub-task contains two words of suitable type, and the next CHECK 20 sub-task might ascertain if the two words of the encounter pair have suitable values to render further action useful. Dividing the CHECK 20 sub-task into further sub-tasks is useful in some embodiments. In some cases, earlier CHECK sub-tasks, with small delays, may be able to avoid further action on the words by later CHECK sub-tasks.

The final sub-task is to accomplish the actual processing required. This sub-task, labeled PROCESS 30 in FIG. 1, may involve any of a wide variety of copying, logical, or arithmetical operations familiar to those skilled in the art. The arrow 17 in FIG. 1 looping back from the bottom of the PROCESS 30 sub-task to the GET 10 sub-task indicates that after processing is complete the stage returns control to the GET sub-task to seek the next encounter pair.

Although FIG. 1 shows only a single PROCESS 30 sub-task, several PROCESS sub-tasks arranged in sequence or in parallel also can be employed. For example, one PROCESS sub-task could modify values in a Northbound word while another PROCESS sub-task modifies values in the Southbound word.

Thus far we have described the algorithm performed at any one stage as a sequential process and, as represented in FIG. 1, have presented the algorithm in sequential form. Of course, such sequential algorithms can be generally implemented in concurrent form as well. Such processing is sometimes called pipeline processing, but in the description that follows, the word "pipeline" is used solely to apply to the flow of Northbound and Southbound information in the main counterflow pipeline. The GET-CHECK-PROCESS algorithm next described requires a flow of task-oriented information orthogonal to the North/South direction of the main pipeline. We will use the concepts of disposition decisions and messages to describe this orthogonal flow of anticipatory control information.

FIG. 2 is a diagram of a concurrent or layered embodiment of the sequential algorithm of FIG. 1. Here, each sub-task is responsible only for handling the Northbound and Southbound parts of the words (labeled "partial words" in FIG. 2) required for its own processing. In this embodiment, separate parts of each word pass through different sub-task layers. The GET 10 process must now inform the other process layers of its disposition decision so that the remaining sub-tasks may act on encounter pairs or pass along unmodified their parts of those words that are not members of an encounter pair, all in accordance with the message reporting the disposition decision sent to them by the GET 10 sub-task.

The GET 10, CHECK 20 and PROCESS 30 sub-tasks in FIG. 2 have the same purpose as described in connection with FIG. 1. Now, however, there are several differences. The first difference is indicated by the internal arrows 11, 21, 31 within each block of the diagram; each sub-task repeats its own operation over and over again, with all three sub-tasks operating concurrently. The sub-tasks operate according to task-oriented control messages flowing from one to the next via communication paths 40, 45, each typically a First-In First-Out register set, or FIFO, labeled as such in the drawings and well known in the art. Such a FIFO can receive messages at its input terminals and deliver them at its output terminals in order of receipt, holding several messages internally that are yet to be delivered, if necessary, thereby buffering the flow of messages.

A second difference between the structure in FIG. 2 and that of FIG. 1 is the omission of the arrows 12, 15, 17 that convey completion messages from the GET, CHECK and PROCESS sub-tasks back to the GET sub-task. These arrows appeared in FIG. 1, where they indicated when the GET sub-task can proceed to make its next disposition decision. In FIG. 2, the input and output ends of the FIFO contain signaling means that indicate, at the input end, the availability of space for another message and, at the output end, the availability of a FIFO output message to direct the actions of the subsequent sub-task. Implicit in FIG. 2 are means to ensure that each sub-task will wait for the messages it needs from its input FIFO and will wait for space in its output FIFO into which to put its own messages.

A third difference between the structures of FIGS. 1 and 2 is that each sub-task is now responsible for communicating its parts of the words directly to the corresponding sub-tasks of the immediately adjacent stages, as shown in FIG. 2.

In the concurrent algorithm embodiment of FIG. 2 the GET 10 sub-task again makes disposition decisions, seeking encounter pairs of words suitable for further action. Now, however, it enters the results of its disposition decisions as messages into the FIFO 40 passing from it to the CHECK 20 sub-task. For example, if it finds that the $n^{th}$ Northbound and the $s^{th}$ Southbound word should be treated together as an encounter pair, it records that fact as a message in the output FIFO 40. If it decides to pass along the $(n+1)^{th}$ Northbound word unmodified, it records that fact in its output FIFO 40 as another message. Having made a disposition decision and recorded the corresponding message in the output FIFO 40, the GET 10 sub-task can proceed to examine subsequent Northbound and Southbound partial words to find the next encounter pair in sequence upon whose parts this stage should act.

Many different encodings of the messages conveying disposition decision are possible. One such encoding records each disposition decision in turn as a separate message. For example, such messages can indicate: "Northbound word should pass unmodified"; "Southbound word should pass unmodified"; or "Treat these Northbound/Southbound words as an encounter pair." Another encoding might record only the sequence numbers of encounter pairs to be used. For example, such messages might indicate that "the $254^{th}$ Northbound word and the $37^{th}$ Southbound word constitute an encounter pair." The particular choice of message encoding format to use depends on the application and the relative frequency of the different kinds of disposition decisions.

Thus, in the concurrent embodiment the CHECK 20 sub-task receives two kinds of information. First, it receives from the main counterflow pipeline communication paths 7 the parts of the Northbound and Southbound words that it needs to CHECK. Second, it also receives, via the FIFO 40 shown above it in FIG. 2, anticipatory control messages about the disposition decisions made by the GET 10 sub-task.

FIFO 40 might deliver messages from the GET process 10 to the CHECK process 20 for three successive disposition decisions indicating that the entire Northbound word is to be passed along unmodified. The CHECK 20 sub-task would accordingly pass along its parts of the three words unmodified, until a message from the FIFO 40 indicates that an encounter pair will appear next. Using another encoding, a message from the FIFO 40 might indicate only that the next suitable pair consists of the $254^{th}$ Northbound word and the $37^{th}$ Southbound word. Given control information in this form, the CHECK sub-task will allow to pass along unmodified its parts of those Northbound words that are earlier than the $254^{th}$, if any, and similarly pass along unmodified its parts of those Southbound words that are earlier than the $37^{th}$, if any, until it has obtained the proper encounter pair parts upon which to carry out its sub-task. Whatever the message encoding in the FIFO 40, the message from the FIFO informs the CHECK process which partial words to pass along unmodified and which to treat as its encounter pair parts. If there is a surplus of Northbound words, the GET 10 sub-task may have decided to pass them along unmodified, and will have so indicated in its output FIFO 40. If so, the CHECK sub-task will permit its partial words quickly to pass along to the next stage.

FIFO 40 between the GET 10 sub-task and the CHECK 20 sub-task carries messages indicative of which words form encounter pairs and which should pass along unmodified. The FIFO 45 between the CHECK 20 sub-task and the PROCESS 30 sub-task provides very similar information to the PROCESS sub-task. According to messages in this FIFO 45 the PROCESS 30 sub-task will either process the partial words of the encounter pairs it receives or pass along its unpaired partial words unmodified. The purpose of the CHECK sub-task is to reduce the number of encounter pairs requiring subsequent processing. If multiple CHECK sub-tasks are used, each attempts to reject encounter pairs proposed from above to save work by the subsequent stage below. The PROCESS 30 sub-task does whatever work is required of it on only its parts of the encounter pairs that have passed all of the CHECKs, i.e., only on the specified portions of the pairs it has been alerted to process.

Figure 3:
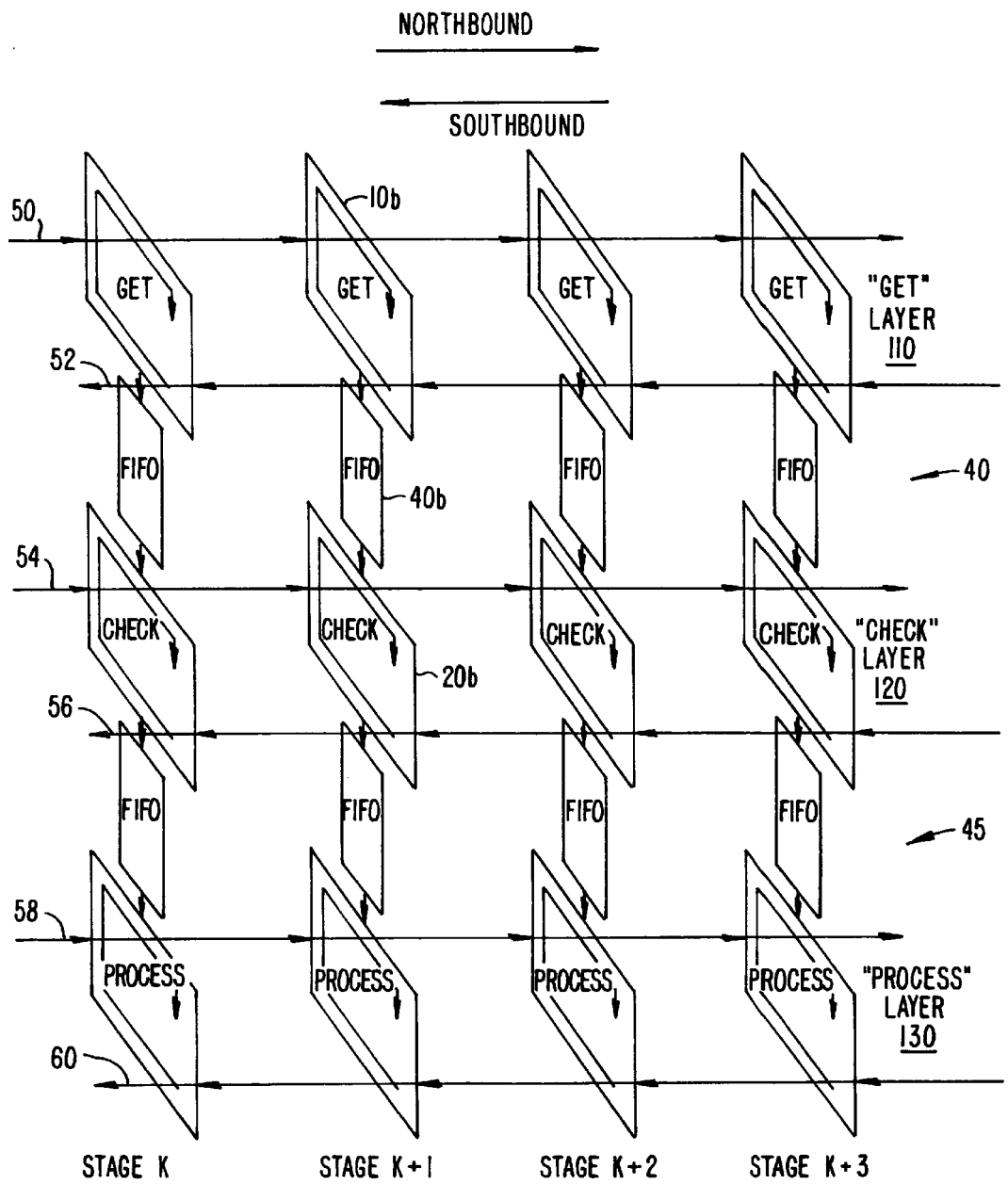
FIG. 3 shows a series of pipeline stages each consisting of three layers, and the data communications path for Northbound and Southbound words.

FIG. 3 illustrates four stages of a layered counterflow pipeline processor. The stages are designated . . . k, k+1, k+2, k+3 . . . Each stage appears as a vertical column in the figure and each implements the GET, CHECK and PROCESS sub-tasks. There are six communication paths between adjacent stages, three in the Northbound direction, designated 50, 54 and 58, and three in the Southbound direction, designated 52, 56, and 60. These paths provide the counterflow pipeline. The FIFOs 40 and 45 that carry disposition decision messages between layers are also shown in the figure. This structure is best visualized as a three-dimensional structure as suggested by the figure, though its actual layout in physical device form may be achieved in any available number of dimensions suited to the technology in which it is implemented.

As described above, the Northbound and Southbound words are each divided into partial words appropriate to the needs of the sub-task layers. If at some time the GET 10b sub-task in a particular stage is working on the $n^{th}$ Northbound word and the $s^{th}$ Southbound word, the CHECK 20b sub-task, at the same time, may be examining its parts of a previous Northbound word, for example the $(n-1)^{st}$, and those of a previous Southbound word, for example the $(s-1)^{th}$. Of course, if the GET 10b sub-task in that stage had previously offered a much earlier encounter pair, the CHECK 20b sub-task might be treating the $(n-4)^{th}$ and $(s-2)^{nd}$ as a pair. The lag from the GET sub-task to the CHECK sub-task may change from time to time, depending on the relative speed of the sub-tasks, the flow of words in the Northbound and Southbound counterflow pipelines, the disposition decisions, and the length of the FIFO 40 carrying messages between the sub-tasks.

It is also possible that the CHECK 20b sub-task for a particular encounter pair requires much more than the usual time. In such a case the CHECK 20b sub-task might be working on a pair of partial words long since past those currently being examined in the GET 10b sub-task. The FIFO 40*b* between the GET 10*b* sub-task and the CHECK 20*b* sub-task will be as long as necessary to store as many disposition decision messages as a particular application finds useful. For any one stage, the GET 10 sub-task can be "ahead" of the CHECK 20 sub-task as far as is permitted by the length of the FIFO 40 between them. The same applies to the FIFO 45 between the CHECK 20 sub-task and the PROCESS 30 sub-task; the CHECK sub-task can be as far ahead of the PROCESS sub-task as the availability of its partial words from adjacent stages and the length of the message FIFO 45 between them permits.

The mechanisms disclosed in our copending U.S. patent application Ser. No. 08/636,260, entitled "Control Chains for Controlling Data Flow in Interlocked Data Path Circuit," and filed Apr. 23, 1996, now U.S. Pat. No. 5,758,139, can be employed to provide coordination between the actions of the GET 10 sub-task and the CHECK 20 sub-task and the message FIFO 40 between them. The flow of words on the Northbound path 50 and the flow downward of messages in the message FIFO 40 together form a two-dimensional pipeline of the type described in the above referenced patent application. Similarly, the Southbound path 52 and the message FIFO 40 also form a two dimensional pipeline. The above patent application describes how to coordinate the flows of data and messages.

If a CHECK 20 sub-task becomes so far behind in its work that the message FIFO 40 fills, the corresponding GET 10 sub-task, detecting that there is no more room in the message FIFO for its disposition decision messages, will cease processing until the CHECK sub-task sufficiently drains the message FIFO to provide room for the next disposition decision message.

The flow of words in the Northbound and Southbound directions within each layer may similarly be held up until the proper control message is available to the next sub-task. For example, if a Northbound partial word arrives at a CHECK 20 sub-task in advance of a control message from the corresponding FIFO 40 above it, the Northbound partial word in that sub-task must wait until the message from the GET 10 sub-task passes through the FIFO 40 to the CHECK 20 sub-task so that the sub-task can determine whether this Northbound partial word is from an encounter pair upon which it must act in this stage. Again, using the teachings of the above referenced patent application, one can build asynchronous FIFOs in more than one dimension.

A PROCESS 30 sub-task gets messages from its corresponding FIFO 45 in the same way that a CHECK 20 sub-task does, but with the difference that it is notified of even fewer encounter-pair partial words upon which to act, and thus more cases in which to pass its partial words along unmodified. A PROCESS sub-task may well pass along most of its partial words unmodified. It will do so, however, only when instructed by its corresponding CHECK 20 sub-task that such partial words are not from encounter pairs upon which it must work.

To return to the earlier example, suppose that a PROCESS sub-task's $254^{th}$ Northbound and the $37^{th}$ Southbound partial words are from the next encounter pair that happen to satisfy the corresponding CHECK 20 sub-task. This fact is encoded as a message or messages in FIFO 45 between the CHECK sub-task and the PROCESS sub-task. Upon receiving such a message or messages, the PROCESS 30 sub-task will pass along, unmodified, Northbound partial words prior to the $254^{th}$ and Southbound partial words prior to the $37^{th}$, but will retain the $254^{th}$ Northbound and the $37^{th}$ Southbound partial words until it has both of them together as an encounter-pair of partial words upon which to act. On the other hand, if the CHECK sub-task's $254^{th}$ Northbound and the $37^{th}$ Southbound partial words fail to satisfy the CHECK sub-task, the PROCESS sub-task will pass each of its corresponding partial words along unmodified without further delay, as directed.

When the control message from the GET sub-task indicates that its two partial words are from an encounter pair in this stage, both the CHECK and PROCESS sub-tasks will hold their partial words and will wait for their matching partial words to arrive. It is possible, of course, that such a delay may be enforced for the CHECK sub-task but prove unnecessary for the PROCESS sub-task if the CHECK sub-tasks finds the encounter pair unsuitable for further action. Eliminating the need to retard data flow for later layers provides an important improvement in performance.

U.S. Pat. No. 5,572,690, cited above, describes a counterflow pipeline system. Its FIG. 1A and text at column 12, beginning at line 20, describes a control system 52 for controlling a data path 50. This structure is further refined in the present invention. One can think of the GET sub-task as the first part of a control system whose objective is to control the flow of partial words in the CHECK sub-task. Furthermore, the GET and CHECK sub-tasks, together, may be thought of as a complex control system whose objective is to control and simplify the PROCESS sub-task.

Figure 4:
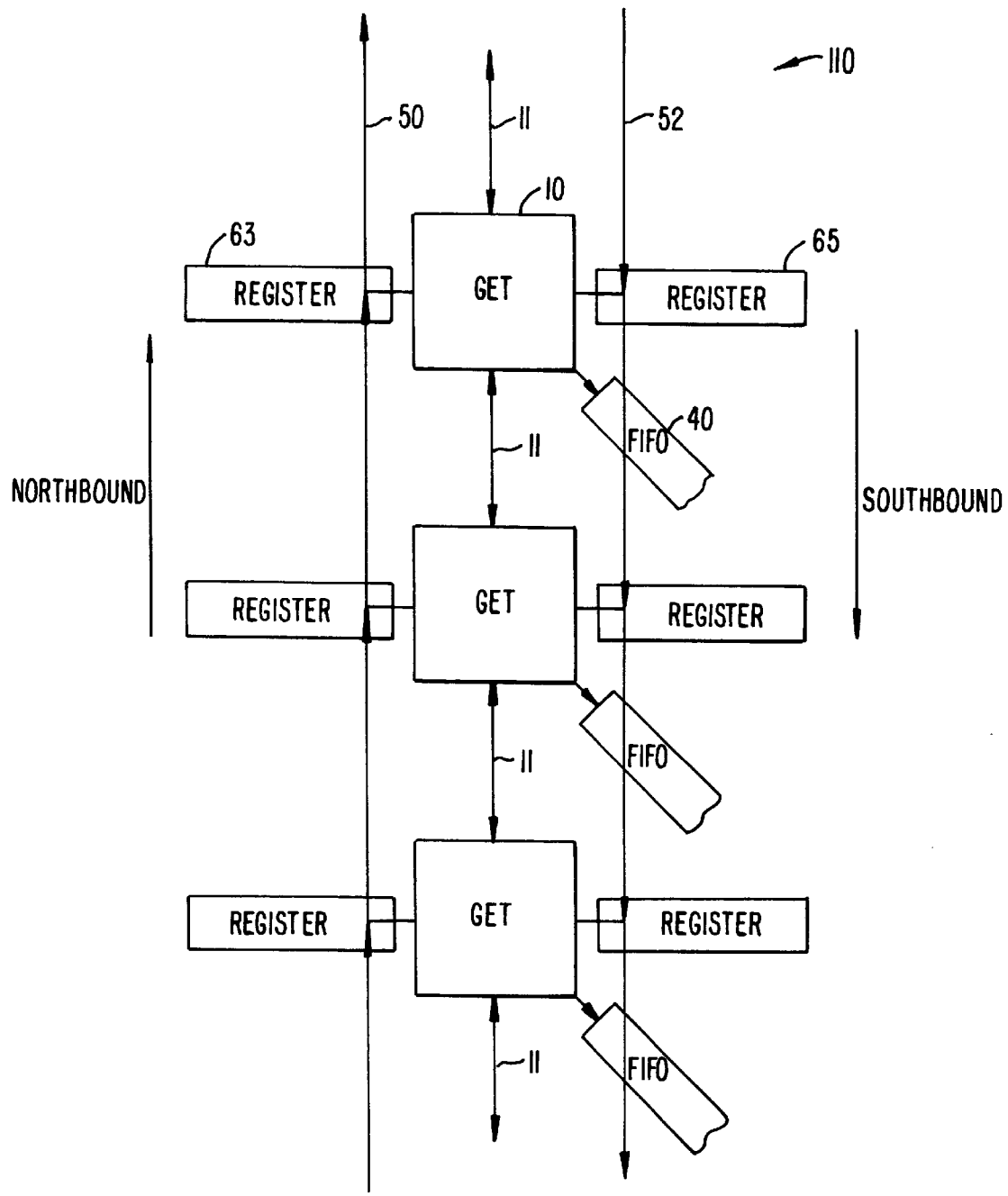
FIG. 4 shows a "GET" layer, along with a part of the FIFOs connecting it to the next layer.

Whereas FIG. 2 of the present invention illustrates a vertical slice through the structure of FIG. 3, FIGS. 4–6 are horizontal slices through the same structure. FIG. 4 shows the GET layer 110. The main Northbound and Southbound data paths 50, 52 (the counterflow pipeline) appear as vertical arrows at the left and right of the figure. These data paths need indicate to the GET layer only that a word exists; the GET layer has no interest in the word's encoded values. The GET layer's task, as mentioned, is to make disposition decisions, seeking encounter pairs of one Northbound and one Southbound data element each. Only such encounter pairs are suitable for action by the other layers. GET layer 110 selects such encounter pairs in advance of the examination of their values by the CHECK layer 120. GET layer 110 puts messages indicative of its decisions into the FIFOs 40, shown diagonally in the figure to indicate connections to another layer below. Most important, the GET layer can devote itself to finding the next encounter pair at the same time as the other layers process previously identified encounter pairs, thus enhancing the speed of processing. The arrangement of layers in which words are divided into constituent partial words and then sent into the appropriate layers provides greater concurrency than can be found in previous non-layered designs.

The GET sub-tasks in the stages must collectively ensure that each and every Northbound word forms an encounter pair with each and every Southbound word in some stage before they pass one another. The GET layer at a particular stage matches up indicators that a Northbound word has arrived and that a potentially suitable Southbound word has also arrived. It then sends a message indicating its disposition decision through its output FIFO. If no suitable Southbound word arrives, the GET layer sends a disposition message through its output FIFO indicating that the subsequent layers may pass their portions of the Northbound word on immediately.

Correct operation of the GET layer thus requires that it properly identify encounter pairs. Several approaches to ensuring proper operation of the GET layer are possible, some of which involve communication of additional control information between adjacent stages within the GET layer. In some cases this communication controls whether Northbound or Southbound partial words are permitted to pass between stages during a particular cycle of operation. In other cases, this communication determines which stage in the GET layer will be put in control of communication between stages concerning the encounter pair. To accomplish this task properly may require additional communication paths 11 between the GET sub-tasks in adjacent stages, as illustrated in FIG. 4. In some asynchronous implementations, proper operation of the GET sub-task may also require arbitration, such as described in our co-pending U.S. patent application entitled "Fast Arbiter with Decision Storage," Ser. No. 08/655,999, filed May 31, 1996, now U.S. Pat. No. 5,805,838.

Because the particular choice of stage in which two words encounter one another is truly an arbitrary decision, many combinations of disposition decisions will produce correct operation of a counterflow pipeline processor. Our experiments have shown, however, that the stage-assigning disposition decisions of the GET layer 110 layer have a significant effect on the speed of operation of the entire system. Poor choices of which stage to assign to each encounter can delay flow in the counterflow pipeline and thus retard operation. Preferably, the delays in the GET layer therefore model as faithfully as possible the average delays that each partial word will experience in the other layers. If the GET layer operates too quickly it will match up pairs of words in stages that are unsuitable for the other layers from a delay point of view. If it operates too slowly, it will again choose unsuitable stages for each pair of words. The buffering in FIFOs 40 and 45 permit the overall system to accommodate a wide range of processing durations.

The quality of disposition decisions made by the GET layer 110 affects only the speed of operation of the system, and not the correctness of the result. For example, suppose that the GET layer makes a poor disposition decision by selecting an inappropriate stage in which to process the $n^{th}$ Northbound and the $s^{th}$ Southbound words. The corresponding CHECK and PROCESS sub-tasks will hold up progress of their partial words until the $n^{th}$ and $s^{th}$ partial words arrive. The inappropriate choice of encounter stage surely means that one partial word, say the Northbound one, arrives much sooner than the other Southbound word. It would have been better to choose a stage farther North, where these two partial words would more naturally arrive at about the same time, thus avoiding the delay. It must be recognized, however, that the correct answer will be produced in either case, since each sub-task follows exactly the directives it is given, stalling data flow, if required, until the requisite elements are available to it.

In other implementations, latches or registers 63, 65 may be used in the GET layer of FIG. 4. This facilitates correct buffering of the data that flows in the North and South directions.

Figure 5:
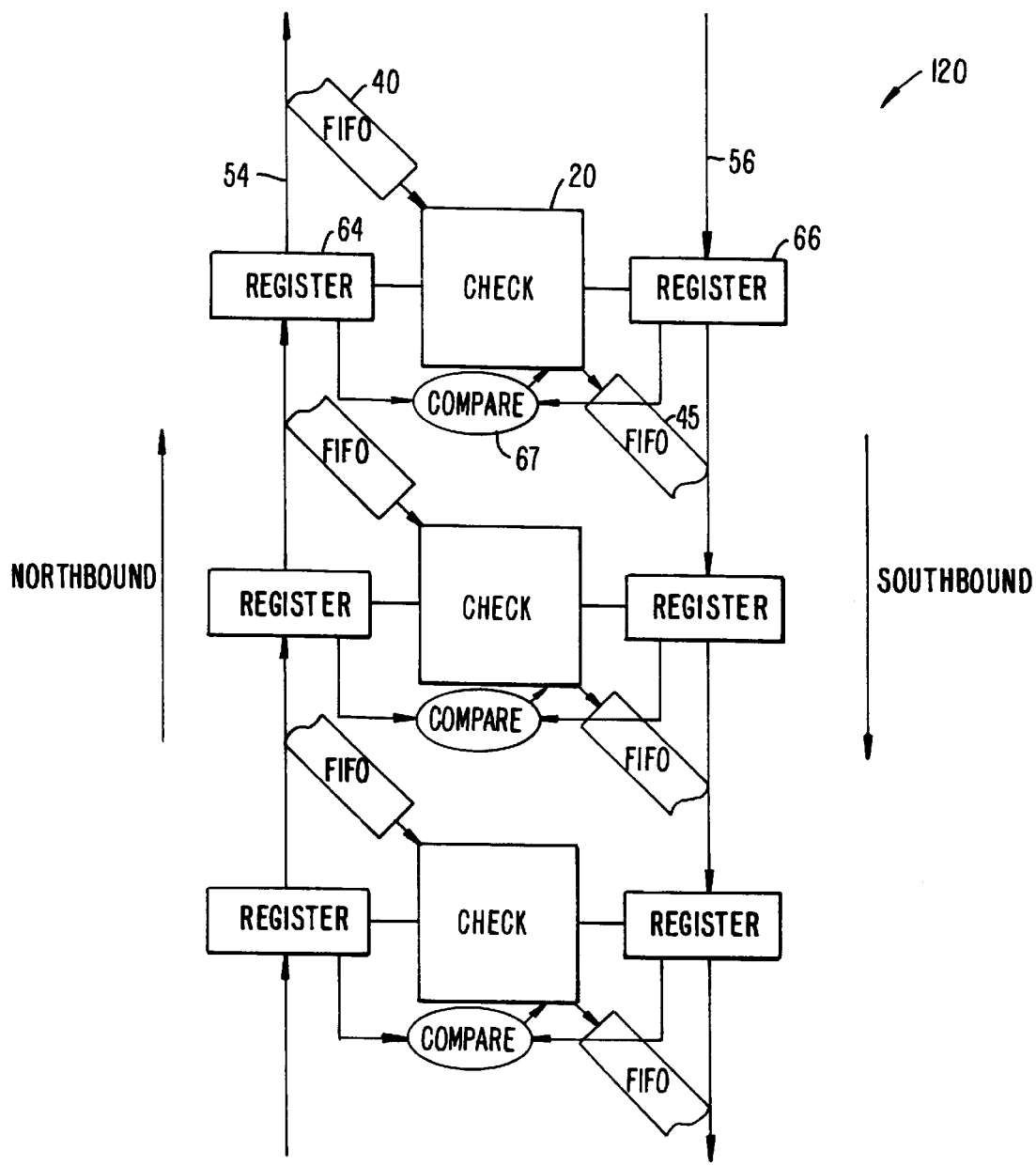
FIG. 5 shows a "CHECK" layer, along with a part of the FIFOs connecting it to the previous and subsequent layers.

FIG. 5 is a diagram of the CHECK layer 120. The check process in each stage is represented by a control box labeled CHECK and a pair of data latches or registers 64, 66 labeled REGISTER to hold the parts of the Northbound and Southbound partial words that are relevant to this layer; a known data latch can serve as the storage means in the asynchronous pipeline. Two FIFOs 40, 45 connect to provide the anticipatory control functions for CHECK 20. An input FIFO 40, shown at the left in FIG. 5, brings anticipatory control messages from the GET layer, while an output FIFO 45, shown at the right in FIG. 5, sends further anticipatory control messages to the PROCESS layer.

The compare 67 shown in each stage represents a logical element that performs whatever data comparison is required to decide whether or not the PROCESS layer should act on this encounter pair. The content of this logical computation depends on the particular application of the stage. In the case of the Counterflow Pipeline Processor described in U.S. Pat. No. 5,600,848, the test is for equality of a Northbound register address field value and a Southbound register address field value.

Figure 6:
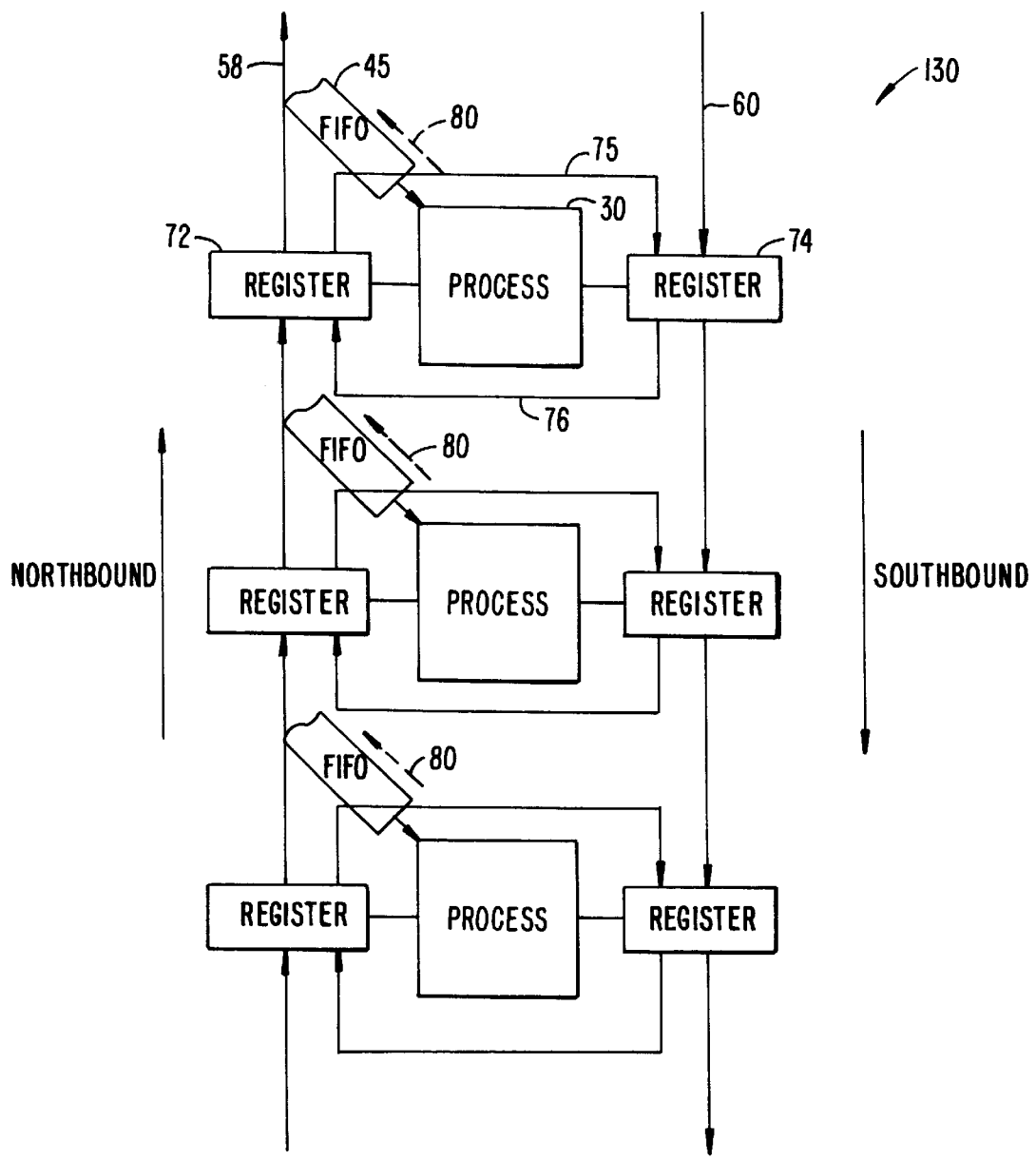
FIG. 6 shows a "PROCESS" layer, along with a part of the FIFOs connecting it to the previous layer.

FIG. 6 is a diagram of the PROCESS layer 130. Again latches or registers 72, 74, to hold the Northbound and Southbound partial words, appear as the boxes labeled REGISTER. Here, however, there are data paths between the two registers in a single stage. The PROCESS layer's control circuits control these data paths 75, 76. These data paths represent the means in the PROCESS layer for selectively replacing data fields in either the Northbound partial word or the Southbound partial word, or both, according to information from itself and/or the oppositely flowing partial word. Those skilled in the art will recognize that the substituted data can be any logical function of the data in the two registers, using means not shown in the figure. The substituted data may also include information passed down from CHECK layer 120. PROCESS layer 130 has no output FIFO, since it is the final layer.

In all of the preceding implementations of the invention described in conjunction with FIGS. 1 through 6, control information has been passed downward through the various layers using FIFOs. There may be implementations of the invention, however, in which it is desirable to have bidirectional communication paths between the layers, enabling lower layers, such as the PROCESS or CHECK layer, to communicate upward to the CHECK or GET layers. Such bidirectional communication paths enable the transfer of intermediate or other results from the PROCESS layer back up to higher layers so that those results can impact subsequent activities in the higher layers. In such situations, the FIFOs 45 shown in FIG. 6 will be replaced with bidirectional communication elements in which information can flow in both directions. This bidirectional flow in some implementations of the invention is illustrated by the dashed arrow 80 shown adjacent the FIFOs 45 in FIG. 6. Although not shown in the other figures, similar bidirectional communications elements would be used in place of FIFOs 40 in FIG. 4 and FIFOs 45 in FIG. 5.

The foregoing has been a description of embodiments of our invention relating to a layered counterflow pipeline structure. It will be appreciated that numerous departures from the specific structure shown may be made without departing from the spirit of the invention, which is further defined in the appended claims and their equivalents. For example, the modules described here have been described with an implicit assumption that events are encoded as transitions, but other encodings are also possible.

What is claimed is:

1. A structure for a computer system processor in which words flow through stages in the processor, the structure comprising:

a first series of first processing elements sequentially connected to one another, individual ones thereof for determining whether a word passing through such first series of first processing elements is to participate in an operation involving the word;

a second series of second processing elements sequentially connected to one another, individual ones thereof for performing an operation on a word passing through such second series of second processing elements; and a first series of coupling elements for providing communication among the processing elements, the first series of coupling elements disposed between the first series of processing elements and the second series of processing elements, individual ones of the first series of coupling elements being coupled between a first processing element and a corresponding second processing element, each of the coupling elements providing a communications path between the processing elements to which it is coupled.

2. A structure as in claim 1 wherein each of the words flowing through the stages is divided into partial words, and one portion of each word is supplied to the first series of first processing elements, while a second portion of each word is supplied to the second series of second processing elements.

3. A structure as in claim 1 wherein the computer system processor comprises a counterflow pipeline processor.

4. A structure as in claim 2 wherein a stage of the processor comprises one of the first series of first processing elements, one of the second series of second processing elements, and one of the first series of coupling elements which couples the one of the first series of first processing elements to the one of the second series of second processing elements.

5. A structure as in claim 4 wherein the coupling elements provide a unidirectional communications path for messages from the first series of first processing elements to the second series of second processing elements.

6. A structure as in claim 5 wherein each of the coupling elements comprises a first-in first-out register set (FIFO) having one end of the FIFO coupled to one of the first series of first processing elements, and having an opposite end of the FIFO coupled to one of the second series of second processing elements.

7. A structure as in claim 6 wherein the FIFO receives anticipatory control messages from the one of the first series of first processing elements to which it is coupled and transfers those messages to the one of the second series of second processing elements to which its opposite end is coupled, a processing action of the one of the second series of second processing elements being controlled by the anticipatory control messages.

8. A structure as in claim 7 wherein the FIFO receives anticipatory control messages from the one of the first series of first processing elements to which it is coupled and transfers those messages to the one of the second series of second processing elements to which its opposite end is coupled, which in turn provides those anticipatory control messages to at least one of a preceding processing element or a subsequent processing element, the processing action of the at least one of the preceding processing element or a subsequent processing element being controlled by said anticipatory control messages.

9. A structure for a computer system processor in which words flow through stages in the processor, the structure comprising:

a first series of first processing elements sequentially connected to each other, individual ones thereof for determining whether a word passing through such first series of first processing elements are to participate in an operation involving the word;

a second series of second processing elements sequentially connected to each other, individual ones thereof for verifying that the words selected by the first processing elements require modification;

a third series of third processing elements sequentially connected to each other, individual ones thereof for performing an operation on a word passing through such third series of third processing elements;

a first series of coupling elements disposed between the first series of first processing elements and the second series of second processing elements, individual ones of the first series of coupling elements being coupled between a first processing element and a corresponding second processing element, each of the first series of coupling elements providing a communications path between the first processing element and the corresponding second processing element to which it is coupled; and a second series of coupling elements disposed between the second series of second processing elements and the third series of third processing elements, individual ones of the second series of coupling elements being coupled between a second processing element and a corresponding third processing element, each of the second series of coupling elements providing a communications path between the second processing element and the corresponding third processing element to which it is coupled.

10. A structure as in claim 9 wherein each of the words flowing through the stages is divided into partial words, and one portion of each word is supplied to the first series of first processing elements, a second portion of each word is supplied to the second series of second processing elements, and a third portion of each word is supplied to the third series of third processing elements.

11. A structure as in claim 10 wherein a stage of the processor comprises one of the first series of first processing elements, one of the second series of second processing elements, one of the third series of third processing elements, one of the first series of coupling elements which couples the one of the first series of first processing elements to the one of the second series of second processing elements; and one of the second series of coupling elements which couples the one of the second series of second processing elements to the one of the third series of third processing elements.

12. A structure as in claim 10 wherein the computer system processor comprises a counterflow pipeline processor.

13. A structure as in claim 9 wherein the coupling elements provide a unidirectional communications path for messages from the first series of first processing elements to the second series of second processing elements, and for messages from the second series of second processing elements to the third series of third processing elements.

14. A structure as in claim 13 wherein each of the coupling elements comprises a first-in first-out register set having one end of the register coupled to one the first series of first processing elements, and having an opposite end of the register coupled to one of the second series of second processing elements.

15. A structure as in claim 14 wherein the first-in first-out register receives messages from the one of the processing elements to which it is coupled and transfers those messages to the one of the processing elements to which its opposite end is coupled.

16. A structure as in claim 15 wherein the messages comprise anticipatory control messages from the one of the processing elements to another of the processing elements, and said another of the processing elements receiving those anticipatory control messages transfers them to at least one other processing element coupled to said another of the processing elements receiving those anticipatory control messages.

17. A structure as in claim 9 wherein each of the first series of first processing elements is configured to perform a GET operation.

18. A structure as in claim 9 wherein each of the second series of second processing elements is configured to perform a CHECK operation.

19. A structure as in claim 9 wherein each of the third series of third processing elements is configured to perform a PROCESS operation.

20. A structure as in claim 9 wherein each of the first and second series of coupling elements provide a bidirectional communications path to permit information to flow in both directions among the first, second and third series of processing elements.

* * * * *